Dec. 1, 1936.　　　　H. G. WARNKE　　　　2,062,849
ELECTRIC WELDING APPARATUS
Filed Nov. 12, 1934　　　4 Sheets-Sheet 1
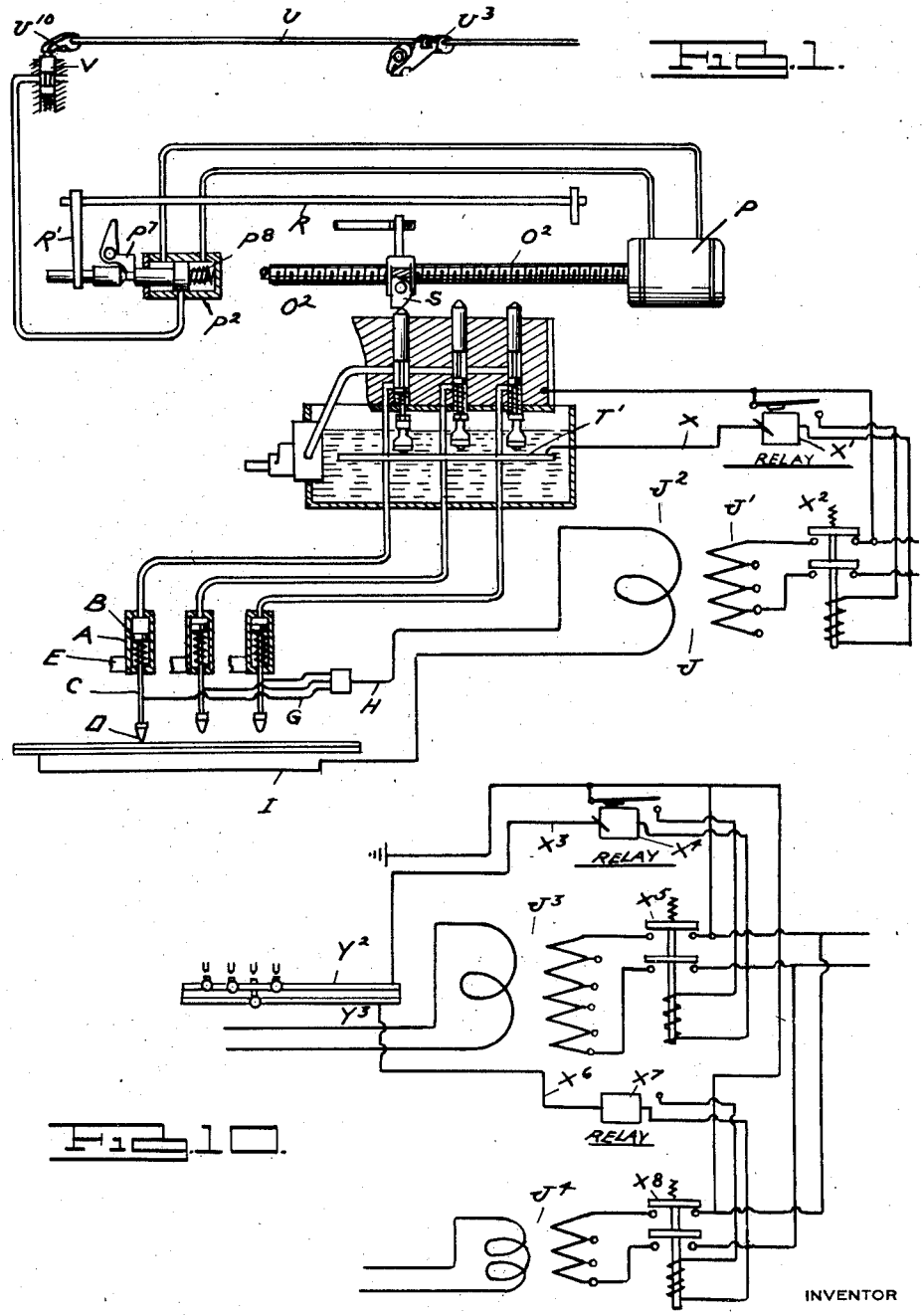
INVENTOR
Hans G. Warnke
BY
Whittemore Hulbert
Whittemore Belknap
ATTORNEYS

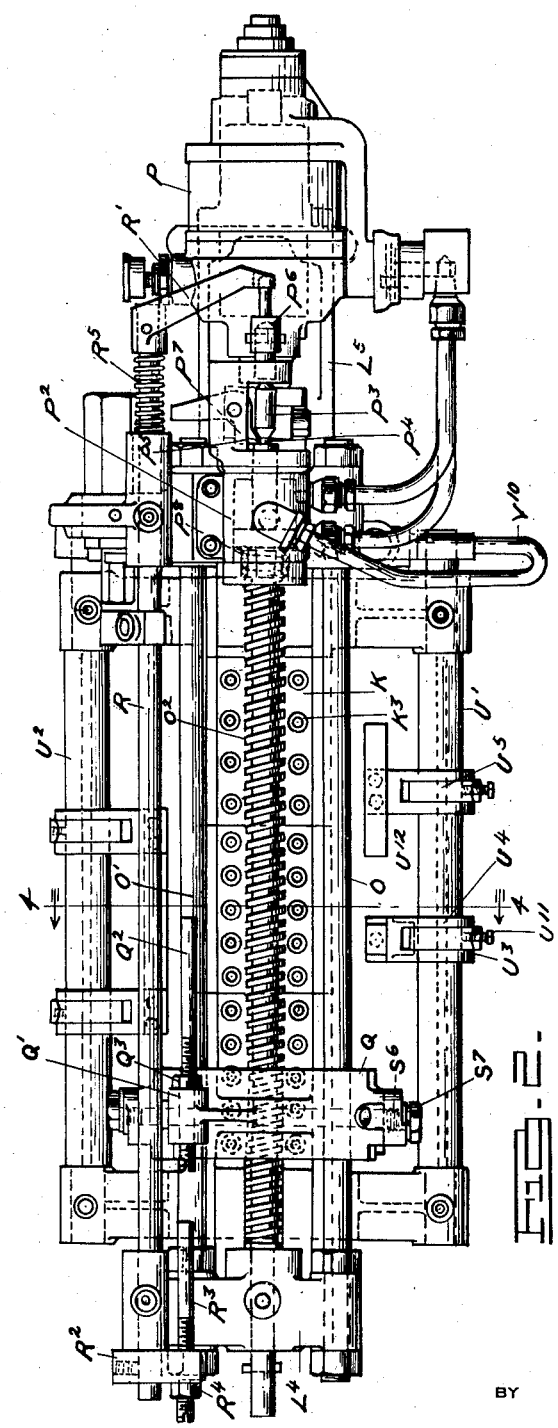

Dec. 1, 1936.   H. G. WARNKE   2,062,849
ELECTRIC WELDING APPARATUS
Filed Nov. 12, 1934   4 Sheets-Sheet 3
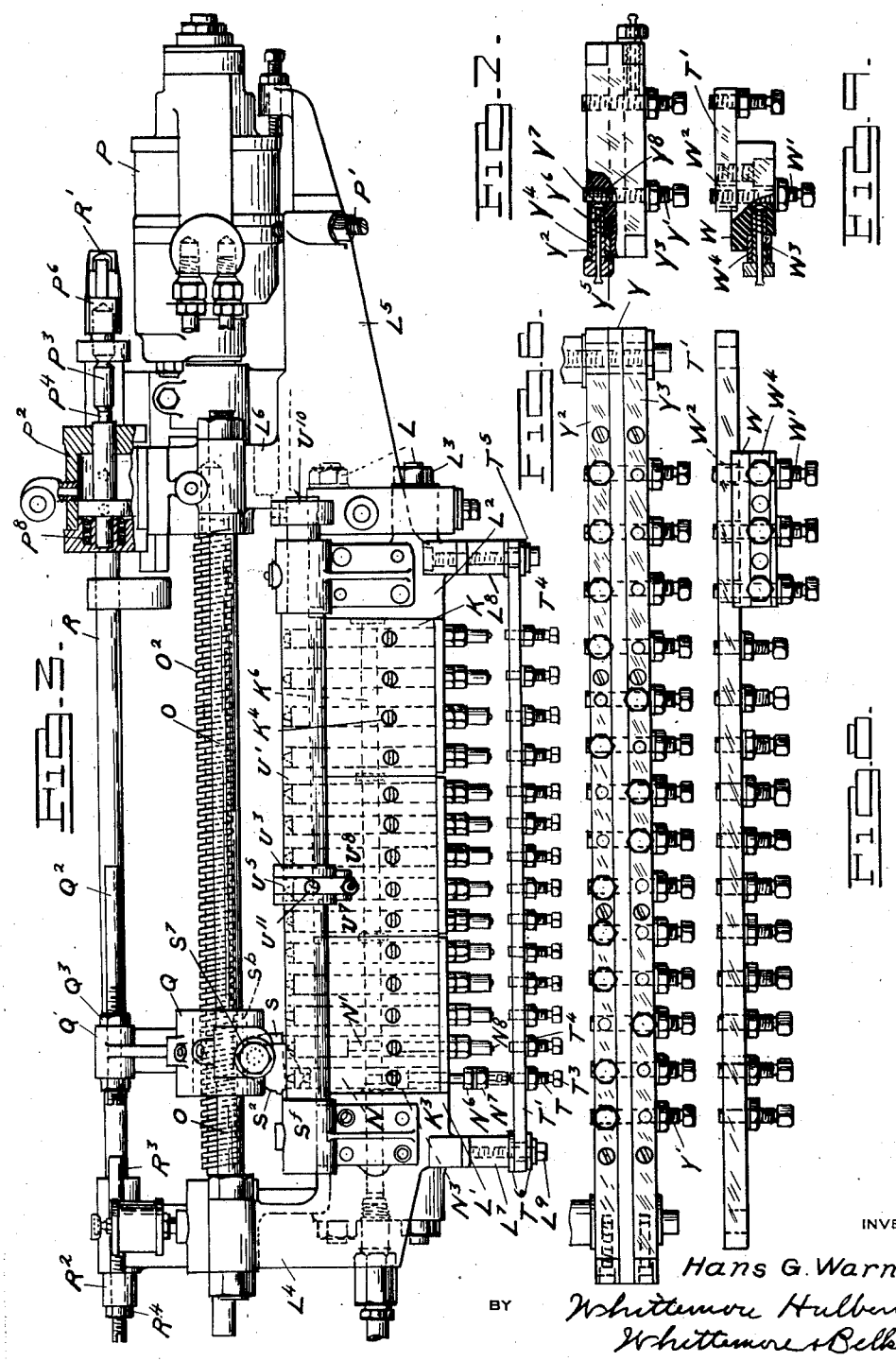
INVENTOR
Hans G. Warnke
BY Whittemore Hulbert
Whittemore & Belknap
ATTORNEYS Dec. 1, 1936.   H. G. WARNKE   2,062,849
ELECTRIC WELDING APPARATUS
Filed Nov. 12, 1934   4 Sheets-Sheet 4

INVENTOR
Hans G. Warnke
BY Whittemore Hulbert
Whittemore + Belknap
ATTORNEYS

Patented Dec. 1, 1936

2,062,849

UNITED STATES PATENT OFFICE 2,062,849

ELECTRIC WELDING APPARATUS

Hans G. Warnke, Detroit, Mich., assignor to Multi-Hydromatic Welding & Manufacturing Company, Detroit, Mich., a corporation of Michigan Application November 12, 1934, Serial No. 752,725

12 Claims. (Cl. 219—4)

The invention relates to electric welding apparatus of that type in which a plurality of welding units individually positioned in a predetermined relation to each other and to the work are successively automatically operated from a control unit. Heretofore apparatus of this general character has been devised in which the individual welding units are successively hydraulically operated to press the electrode against the work and to supply electrical current thereto. The successive operation is accomplished through the movement of a traveler in conjunction with a series of valves and electric switches successively actuated thereby. The timing of the operation is determined by the speed of the traveler which in turn is controlled by the velocity of movement of its actuating mechanism. Thus where this mechanism is moved at constant speed, the successive welding operations will be the same, both as to the interval of time in which pressure is applied to the electrode and the portion thereof during which current is supplied therethrough. However, for certain kinds of work requiring a series of welds, it is desirable to use welding units of a somewhat different character and which require different time intervals for the successful performance of their functions, or a larger or smaller current volume. It is therefore one of the objects of the present invention to obtain a construction of control mechanism in which the timing of operation of the successive welding units may be varied as desired, while still maintaining the automatic sequential operation. It is a further object to more accurately determine the relative length of time during which the electrode is pressed against the work and the electric current is supplied thereto. Still further it is an object to provide means for varying the volume of current which is supplied through one electrode with respect to that supplied through other electrodes. With these and other objects in view the invention consists, first, in the novel construction of the automatic control unit, and second, in various specific features of construction as hereinafter set forth.

In the drawings:

Fig. 1 is a diagrammatic view of a multiple electric welding apparatus to which my improved control unit is applied;

Fig. 2 is a plan view of the control unit;

Fig. 3 is a side elevation thereof;

Fig. 6 is a view similar to a portion of Fig. 3 showing a modified construction;

Fig. 7 is a sectional end elevation thereof;

Fig. 8 is a view similar to Fig. 6 showing another modification;

Fig. 9 is an end elevation thereof.

Fig. 10 is a diagram similar to a portion of Fig. 1 showing a modified construction.

Figure 5:
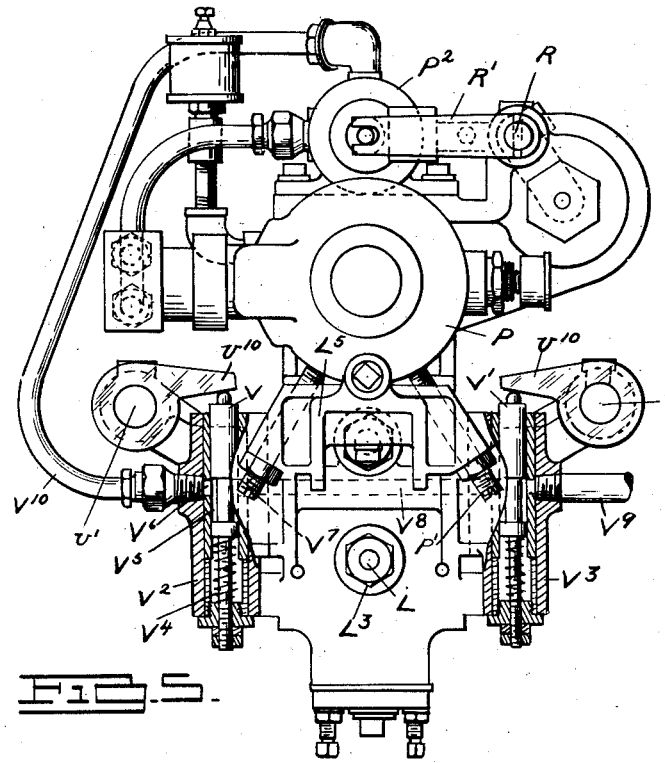
Fig. 5 is an end elevation.
Figure 4:
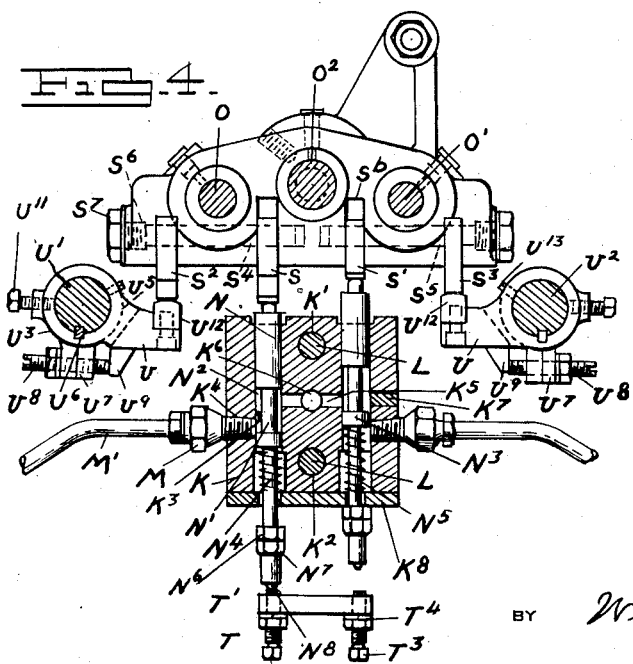
Fig. 4 is a cross section on line 4—4, Fig. 2.
Figure 11:
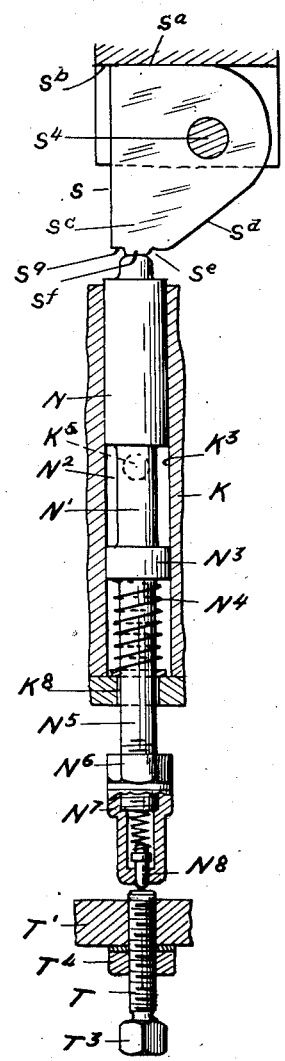
Fig. 11 is an enlarged sectional elevation of one of the valves and electric circuit closers together with its actuating cam.

The specific construction of the individual welding units is not essential to the present invention, but in general each of these units comprises an hydraulic cylinder A containing a piston B, a piston rod C and an electrode D connected with the lower end of said rod. The cylinder A is secured to a suitable bracket E which is mounted in predetermined relation to a jig (not shown) for supporting the work. Electrical current is supplied to each of the electrodes through flexible conductors G attached to a supply conductor H and a return conductor I is arranged beneath the work and supports the same. The conductors H and I are connected to secondary leads from a transformer J which supplies current at the desired voltage.

My improved controller may be arranged in any desired relation to the jig and welding units mounted thereon, and is of the following construction:

K are control units each adapted to control a predetermined number of welding units such for instance as ten, and these control units are adapted for mounting in series with each other in any desired number. Each unit comprises a rectangular block which is longitudinally apertured at K', K² for the passage of clamping rods L extending the entire length of the series. At opposite ends of the series are heads, L' and L² which are also apertured in alignment with the apertures K', K² for the passage of the rods L. Nuts L³ engaging threaded ends of the rods L serve to clamp all of the units and the heads in rigid relation to each other.

As above stated, each unit K controls a plurality of welder units and to this end the block is provided with cylindrical bores K³ preferably arranged in two series in parallel vertical planes extending longitudinally of the block on opposite sides of the center thereof. Each bore has connected thereto a transverse bore K⁴ threaded for engagement with a coupling M which connects it with a flexible conduit M' leading to the cylinder A of the particular welding unit to be controlled. There are also bores K⁵ extending transversely of the block from one side thereof and intersecting the corresponding cylinders $K^3$ of the two series. These bores also intersect a central longitudinally extending passage $K^6$ and the outer end of each bore $K^5$ is stopped by a plug $K^7$. The passages $K^6$ in the several units all register with each other and serve as a fluid supply connection extending from a suitable source of fluid under pressure to each of the cylinders of both series.

In each of the cylinders $K^3$ is a piston N slidably fitting the same and provided with a reduced portion N' which forms therearound an annular fluid channel $N^2$. This channel communicates with the transverse bore $K^5$ so that fluid from the passage $K^6$ is always in communication with said annular channel. In the normal position of each piston a head $N^3$ at the lower end thereof is raised above the passage $K^4$ so as to cut off communication from the channel $N^2$. However, when the piston is depressed, the head $N^3$ will pass below the passage $K^4$ which establishes communication between said passage and the channel $N^2$ and also with the supply conduit $K^6$. The piston is held normally in raised position by a spring $N^4$ surrounding a reduced shank $N^5$ which depends from the head $N^3$ and passes through an aperture in a plate $K^8$ secured to the lower face of the block K, said plate forming an abutment for the lower end of each spring $N^4$. Upward movement of the piston under the resilient pressure of the spring is limited by a nut $N^6$ engaging a threaded portion of the stem $N^5$. There is also a lock nut $N^7$ threadedly engaging the stem and carrying at its lower end a spring pressed electrical contact $N^8$.

The head L' at one end of the series has an upwardly extending portion $L^4$, and the head $L^2$ at the opposite end has the outward extension $L^5$ and an upward extension $L^6$. The portions $L^4$ and $L^6$ are longitudinally connected with each other by a pair of spaced parallel rods O, O' and parallel to these rods is a screw threaded shaft $O^2$ which at one end is journaled in a bearing in the upwardly extending portion $L^4$, and at its opposite end is coupled to a rotary air motor P by means of which it is revolved. As this air motor may be of any suitable construction, I have merely shown the same in elevation as mounted upon the outward extension $L^5$ of the head $L^2$, being suitably adjusted in alignment with the shaft $O^2$ by screws P'. At the upper end of the portion $L^6$ is mounted a control valve $P^2$ by means of which the direction of rotation of the motor P may be reversed, as will be hereinafter set forth. Q is a traveler slidably mounted upon the parallel rods O, O' and having a nut engaged with the threaded shaft $O^2$ by which it is caused to move from one end to the other, depending upon the direction of rotation of the motor. The traveler is also provided with means for operating the reversing valve $P^2$ for the rotary motor P so that after traveling to one end of the screw threaded shaft, its direction will be reversed to travel back to the opposite end, where its movement is arrested. This reversing mechanism includes a stem $P^3$ for the reversing valve $P^2$ which extends rearwardly therefrom and is provided with an annular groove $P^4$ and a collar $P^6$. $P^7$ is a latch in the form of a bell crank lever having a nose portion $P^5$ on one arm thereof for engagement with the groove $P^4$. $P^8$ is a spring in the valve casing for urging the valve to the right, Fig. 2. When, however, the latch is in engagement with the groove $P^4$, the shoulder of said groove engaging the nose piece $P^5$ will hold the valve in the reverse position against the tension of the spring $P^8$. R is a rod slidably engaging bearings in the heads $L^4$ and $L^6$ and having at one end a laterally projecting arm R' bifurcated at its outer end to embrace the valve stem $P^3$ in rear of the collar $P^6$. $R^2$ is an arm projecting laterally from the opposite end of the rod R and carrying at its free end a longitudinally adjustable pin $R^3$ having a threaded engagement therewith, being locked by a nut $R^4$. Q' is a post projecting upward from the traveler Q and carrying at its upper end a trip rod $Q^2$ passing through an aperture in said post and being threaded for engagement with nuts $Q^3$ by which it is adjustably secured in position. The trip rod $Q^2$ extends parallel to the screw and in axial alignment with the pin $R^3$, against which it abuts when the traveler Q is at the end of the screw adjacent to the head $L^4$. $R^5$ is a spring sleeved on the rod R between the bearing on the head $L^6$ and the arm R', for moving said rod and arm when movement of the traveler Q disengages the rod $Q^2$ from the pin $R^3$.

The construction just described is such that when the carriage Q is adjacent to the bearing $L^4$ the valve $P^2$ will be in neutral position where the motor P is at rest. To start operation, the rod R and arm R' are manually moved so as to actuate the stem $P^3$, moving the valve $P^2$ to a position where the latch $P^7$ engages the groove $P^4$. In this position movement is imparted to the motor P in a direction to cause the screw $O^2$ to move the carriage Q towards the head $L^6$. As the traveler approaches said head the trip rod $Q^2$ will engage the bell crank arm of the latch $P^7$, releasing said latch from the groove $P^4$ and permitting the spring $P^8$ to move the valve into reversing position. This will impart opposite rotation to the motor P and screw $O^2$, thereby causing the traveler to move in the opposite direction towards the head $L^4$, and when the end of the trip rod $Q^2$ engages the pin $R^3$ it will move this pin, rod R and arm R' causing the latter through its engagement with the collar $P^6$ to move the stem $P^3$ until the valve $P^2$ is again in neutral position, thereby arresting further rotation of the motor. Thus after each manual operation of the valve $P^2$ to start the motor P, the traveler will move the length of the screw $O^2$ and will return to its original position.

Mounted upon the traveler Q are a transverse series of rockable cam members S, S', $S^2$ and $S^3$. These are detachably secured in position by engaging slots in the frame of the traveler and pivotally engage pins $S^4$ and $S^5$ which extend transversely to said slots through apertures in the cams. The ends of the pins $S^4$ and $S^5$ have threaded portions $S^6$ engaging correspondingly threaded portions of the bores and with polygonal heads $S^7$. This permits of quickly detaching the pins whenever it is desired to exchange the cams. The cams S and S' are respectively in alignment with the two series of pistons N on opposite sides of the center of the blocks K, so that during movement of the traveler said cams will successively engage the upper ends of said pistons. The construction is, however, such that during movement of the traveler in one direction as from the head $L^4$ towards the head $L^6$, the cam S will successively operate the valves in alignment therewith while the cam S' will rock so as to pass over the other series of valves without actuation of the same. On the other hand, when the traveler is moved in the opposite direction from the head $L^6$ towards the head $L^4$, the cams S' will successively operate the valves aligned therewith while the cam S will rock to pass over its valves without operation. Thus the two series of valves on opposite sides of the center of the blocks K become in effect a single series, one-half of which is operated during the movement of the traveler in one direction and the other half during its movement in the reverse direction. The cams S and S' are similar in construction but are reversely positioned in relation to the traveler Q so that one will operate when the traveler is moving in one direction and the other when the traveler is moving in the reverse direction.

When operating, each of the cams will successively depress the piston valves N during movement of the traveler and this as before described will open the port supplying hydraulic fluid to the corresponding welder unit through the connecting conduit M'. In addition to the function of controlling the hydraulic fluid for depressing the electrode of the welding unit, each of the valves N performs the additional function of closing an electric circuit controlling the supplying of current to said electrode. To this end the lower end of the shank of the piston valve is provided with a contact pin $N^8$, previously described, which is adapted to connect with a cooperating adjustable contact member when the valve piston is fully depressed by the cam. The cooperating contact members T for the valves of the series are mounted upon a supporting bar T' which extends beneath the units K and is secured to depending portions $L^7$ and $L^8$ respectively on the heads L' and $L^2$ by means of clamping screws $L^9$. The contacts T are arranged in two series corresponding to the two series of valves N and each individual contact is in alignment with its corresponding valve. For securing proper adjustment the contact member T is threaded and engages a correspondingly threaded aperture in the bar T', being provided with a polygonal head $T^3$ and a lock nut $T^4$ for holding the contact in adjusted position. With the construction as shown in Fig. 2, the bar T' is metallic and forms a part of the electrical circuit. It is therefore necessary to insulate this bar from its supports and as shown, bushings $T^5$ surround the clamping bolts $L^9$ where they pass through the bar T' and insulator washers $T^6$ are placed between the bar and its supports and also between the bar and the screws $L^9$. This construction is used where the current supplied to the welder electrodes is the same in each of the units but where it is desired to change the current volume supplied to one unit from that supplied to another unit, I provide a different construction, which will be later described.

Each of the controlling cams S and S' is provided with a shoulder portion $S^a$ at one side of the pivot pin for bearing against the top wall $S^b$ of the slot in which the cam is located, thereby limiting the rocking movement of the cam in one direction. $S^c$ is the nose portion of the cam for engaging with the valves N which has an oblique portion $S^d$ for first depressing the valve, a step $S^e$ for holding the valve in a position where the fluid port is open, but before the electrical contact $N^8$ is closed with the cooperating contact T, a portion $S^f$ for further depressing the valve and closing the electric circuit through engagement of the contact $N^8$ with the contact T and a portion $S^g$ which opens the circuit but still holds the port open which supplies pressure to the electrode. By this arrangement it will be understood that the electrode D is moved in contact with the work and pressed thereagainst in advance of supplying electrical current, and after cutting off the current the electrode is still pressed against the work for a brief time interval. The exact timing of the interval in which current is supplied may be varied by adjusting the contact member T in its screw threaded bearing which enables the operator to obtain the best effect.

With the apparatus as thus far described, the cams S and S' will operate the same on each of the valve pistons N so that the welding units controlled by said valves will be operated all alike. However, as above stated, it is frequently desirable to vary the effect produced by different welding units, which may be accomplished either by changing the time interval during which current is supplied or by changing the volume of current supplied during the interval. For producing the first effect, I have provided means for varying the speed of rotation of the motor P, this producing corresponding change in the speed of movement of the traveler and the length of time in which the cam is operating on the valve. As the motor P is operated by compressed air, its speed may be regulated by variably throttling the air supply. However, this throttle must be properly timed with the movement of the traveler over the cams, which is accomplished by the following construction: It has been stated that in addition to the cams S and S' there are two other cams $S^2$ and $S^3$ which are pivotally supported on the pins $S^4$ and $S^5$. These cams $S^2$ and $S^3$ cooperate with a series of rock arms U which are connected to rock shafts U' and $U^2$ arranged on opposite sides of the blocks K. The shafts U' and $U^2$ are journaled in brackets $U^3$ detachably connected to the heads $L^4$ and $L^5$ so that whenever it is desired to change the number of rocker arms on these shafts, they may be quickly detached for that purpose. Each rocker arm U has a bifurcated portion $U^4$ with the furcations thereof apertured for sliding engagement upon the shaft U' and $U^2$. Between the furcations is a split collar $U^5$ which has a key engagement $U^6$ with the shaft by which it is held from relative rotation. An arm $U^7$ on the collar $U^5$ supports an adjusting screw $U^8$ which cooperates with a lug $U^9$ on the rocker U to vary the angular position of said rocker with respect to said shaft. This construction permits of changing the amplitude of rocking movement imparted to the shafts U' and $U^2$ under the actuation of cams $S^2$ and $S^3$ and cooperating rocker arms U, by angularly adjusting said rocker arms with respect to the shaft.

At one end of each shaft U' and $U^2$ is secured a rocker arm $U^{10}$ which is adapted during the rocking movement of the shaft to operate a throttle valve controlling the air supplied to the motor P. As shown, two of such throttle valves V and V' are arranged on opposite sides of the head $L^2$, and each is adapted to restrict the air flow independently of the other. The valves V and V' are pistons slidably secured in cylinders respectively in the valve casings $V^2$ and $V^3$, being urged upward by springs $V^4$ arranged within these housings and being moved downward by the rocker arms $U^{10}$. The valves may be of any suitable construction such as having an annular groove $V^5$ in the piston permitting passage of air between ports $V^6$ and $V^7$ on diametrically opposite sides of the valve casing. The ports $V^7$ of the two valve casings $V^2$ and $V^3$ are connected to each other by a passage $V^8$ through the head $L^2$ so that the two valves are in series with each other. Air is supplied to the casing $V^3$ from a conduit V⁹ and the port V⁶ of the casing V² is connected by a conduit V¹⁰ with the inlet of the valve casing P. It will thus be understood that when either one of the valves V and V' is depressed by the operation of its corresponding rock arm U¹⁰, it will restrict the flow of air which is supplied to the valve casing P and the amount of restriction corresponds to the degree of depression of the valve. This in turn depends upon the angular movement of the rock shaft U' or U² which may be varied by the adjustment of the rocker arms U. Thus where it is desired to increase the time of operation of one or more of the welder units one of the rock arms U is adjusted into transverse alignment with the valve N which controls this particular unit, and is secured in this position by clamping the split collar to the rock shaft by means of a screw U¹¹. The rock arm is then angularly adjusted to the desired degree by means of the screw U⁸. When properly adjusted, one of the throttle valves V or V' will be operated to slow the rotary motor T while it is moving the traveler Q and cam S or S' over the corresponding valve N. Consequently the interval during which the valve is depressed is lengthened which correspondingly lengthens the interval during which the electrode is pressed against the work and that during which current is supplied.

Where there are several welder units which require the same timing, these may all be controlled by a single rocker arm U on the shaft U' by providing such arm with a bridge member U¹². This may be extended to any length to correspond with the desired number of valves N controlling the said welder units and thus the cam S² or S³ will hold the rock arm depressed while the traveler is passing all of said valves. This simplifies the construction, as it avoids the necessity of individual rock arms U for each of the welders and individual adjustment thereof.

Another means of varying the operation of different welders in the series is by increasing or decreasing the current volume in the welding circuit. Where this is desired, the bar T' carrying the series of contacts T is exchanged for a substitute bar Y of insulating material. This carries a series of adjustable contact members Y' which may be the same in construction as the contacts T having a threaded engagement with the bar Y. Mounted on opposite sides of the bar Y are pairs of conductor bars Y² and Y³, which preferably extend the entire length of the bar and are spaced from each other to be out of electrical connection. One of the bars Y² is connected into an electrical circuit for controlling a transformer supplying current at low voltage, and the other bar Y³ is similarly connected into a circuit controlling a transformer for supplying current at higher voltage. These control circuits are completed through the individual contact members Y', each of which is electrically connected either to the bar Y² or the bar Y³ by means of transversely extending connectors Y⁴. These extend through transverse bores in the bar Y and are preferably formed of a headed bushing member Y⁵ threadedly engaging the bars Y² or Y³, and a contact pin Y⁶ passing through said bushing having a head Y⁷ for contacting with the member Y' and with a spring Y⁸ between said head and the bushing Y⁵ for maintaining contact. With this construction all of the welder units which require a large current volume have their contacts Y' connected to the bar Y³ while those using a lesser volume of currents have their contacts Y' connecting with the bars Y². Further variation may be accomplished by varying the speed of the traveler as before described.

Where there are only a few of the welder units requiring a larger current volume, I may use in place of the construction last described the bar T' and contacts T previously described and mount upon this bar an insulator block W. Adjustable contacts W' similar to the contacts T are threadedly engaged with this block and pass through enlarged apertures W² in the bar T' so as to be out of electrical connection therewith. Transversely extending connectors W³ similar in construction to the connectors Y⁴ connect the contacts W' with metallic bars W⁴ which are mounted on the front side of the block W. Thus all of the welder units which are supplied with a larger volume of current have their control circuits connected to the bar Y⁴ while those requiring less current have their control circuits connected to the bar T'.

The construction of the automatic control being as above described, the operation is as follows: The individual welder units are first mounted on a jig in predetermined relation to the work to be supported thereon, as has been previously described. The automatic control is then coupled to the welder units by means of the flexible conduits M' so that the welders are operated in the desired sequence. To expedite the work two jigs may be employed, the welders of one being controlled by one series in the controller and the other by the second series. In this way the operator may utilize the time during which the work in one jig is being welded for removing the completed work from the other jig and engaging new work to be welded.

When the control is properly coupled to the welders it is supplied with compressed air and liquid under the desired hydraulic pressure from any suitable source. Preferably the pump for supplying hydraulic pressure is incorporated as a part of the control unit, but as this forms no part of the present invention it is not illustrated or described, as it is obvious that the operation will be the same, whatever the source of such liquid under pressure. The electrical circuits are illustrated in Figs. 1 and 10. In the former the bar T' is used, being connected by a conductor X with a relay X' which operates the circuit closer X² for the primary coil J' of the transformer J. As previously stated, the secondary coil J² of this transformer is connected to the conductors H and I for the welder units. With the construction illustrated in Fig. 10, the substitute bar Y is used, the conductor bars Y² and Y³ of which are connected to control different transformers or different steps of the same transformer. Thus as shown, the bar Y² is connected by a conductor X³ to a relay X⁴ controlling the circuit closer X⁵ for the primary of a low voltage transformer J³. The bar Y³ is similarly connected through a conductor X⁶ with a relay X⁷ controlling a circuit closer X⁸ for the primary of a higher voltage transformer J⁴. The secondary circuits of the transformers J³ and J⁴ are alternatively connected to the welder units, depending upon whether a small or a large volume of current is required.

Where it is desired to lengthen the time of operation of certain of the welder units, rock arms U on the shafts U' or U² are adjusted into registration with the valve pistons which control said welder units. This is accomplished by loosening a set screw U¹¹ in the collar U⁵ and sliding said collar along its shaft U' or U² to the desired position and then again tightening the set screw. Angular adjustment of the rocker arm U with respect to its shaft is then made by the adjusting screw U³, this determining the amplitude of movement of the throttle valve V or V' and consequently its throttling effect.

When all adjustments have been properly made, operation is started by the manual manipulation of the valve stem P³ which as previously described starts the motor P in a direction to cause movement of the traveler from the head L⁴ towards the head L⁵. During this movement the cam S will successively depress the piston valves N which first press the corresponding electrodes against the work and then supply them with current. Each one of the rocker arms U is positioned in registration with a particular piston valve so that during the interval in which said valve is depressed the rocker arm U will also be depressed. Thus the valve V or V' will be positioned to restrict the admission of air to the motor P, thereby slowing its speed and correspondingly slowing movement of the traveler. As soon as the cam S² or S³ on the traveler disengages from the rocker arm U, the spring V⁴ will raise the throttle which will restore full speed to the motor P and the traveler Q.

When the machine is adjusted as shown in Fig. 10, the volume of current supplied to the individual welders may be varied depending upon whether their control circuits are coupled to the bar Y² or the bar Y³. Thus an increased heating effect may be produced either by slowing the motor P to lengthen the time interval or by increasing the voltage to enlarge the current volume or by a combination of both. This gives great flexibility to the apparatus so that it may easily be adapted to meet any condition which is involved in the performance of the work.

What I claim as my invention is:

1. In a welding machine, the combination with a series of individually operable welding units, of a series of controls for the respective units, a traveler for operating said controls in sequence, means for varying the speed of movement of said traveler and a control for said speed varying means positionable in predetermined relation to a selected welding unit control to be operable simultaneously therewith by said traveler so as to alter the length of the welding operation of the corresponding welding unit.

2. In a welding machine, the combination with a series of individually operable welding units, of a series of controls for the respective units, a traveler for operating said controls in sequence, means for driving said traveler at a predetermined speed, means for progressively varying said speed, a control for said speed varying means positionable in predetermined relation to a selected welding unit control to be operable simultaneously therewith by said traveler, and means for adjusting said speed control to change the magnitude of speed variation effected thereby and to correspondingly vary the operation of the corresponding welding unit.

3. In a welding machine, the combination with a series of individually operable welding units, of a control unit therefor comprising a frame, a series of controls for the respective units mounted on said frame, a traveler movable on said frame and engageable with controls to operate the same in sequence, a drive mechanism for said traveler, means for progressively varying the speed of said drive mechanism and controlling mechanism for said speed varying means comprising a rock shaft extending longitudinally of said frame parallel to the direction of movement of said traveler, a rock arm on said rock shaft operatively connected to said speed varying means, and a rock arm adjustable longitudinally of said rock shaft into predetermined relation to a selected welding control to be operable simultaneously therewith by said traveler and to thereby alter the length of operation of the corresponding welding unit.

4. In a welding machine, the combination with a series of individually operable welding units, of a control unit therefor comprising a frame, a series of controls for the respective units mounted on said frame, a traveler movable on said frame and engageable with said controls to operate the same in sequence, a drive mechanism for said traveler, means for progressively varying the speed of said drive mechanism and controlling mechanism for said speed varying means comprising a rock shaft extending longitudinally of said frame parallel to the direction of movement of said traveler, a rock arm on said rock shaft operatively connected to said speed varying means, and a rock arm longitudinally adjustable on said rock shaft into predetermined relation to a selected welding unit control to be operable simultaneously therewith by said traveler, and means for angularly adjusting said rock arm to change the magnitude of speed variation and to correspondingly change the time of operation of the corresponding welding unit.

5. In a welding machine, the combination with a series of individually operable welding units, of a series of controls for the respective units, a traveler for operating said controls in sequence, means for varying the speed of movement of said traveler, a rock shaft extending parallel to the path of movement of said traveler for actuating said speed varying means, a rock arm adjustable longitudinally of said rock shaft into predetermined relation to a selected control, a cam carried by said traveler for engaging said rock arm to actuate the same and thereby vary the speed of the traveler, and means for relatively adjusting said rock arm and cam to change the amplitude of rocking movement and thereby change the variation in speed of the traveler.

6. In a welding machine, the combination with a series of individually operable welding units, of a series of controls for the respective units, each control including a depressible piston, a traveler moving parallel to said series of controls, a cam carried by said traveler for successively depressing said piston, means for moving said traveler at a predetermined maximum speed, means for retarding the speed of movement thereof, a rock shaft for actuating said speed retarding means extending parallel to the path of movement of said traveler, a rock arm longitudinally adjustable on said rock shaft into predetermined relation to a selected control, and a second cam carried by said traveler in alignment with said first cam for depressing said rock arm and thereby slowing movement of said traveler while passing said control.

7. In a welding machine, the combination with a plurality of individually hydraulically operated welding units, of a series of controls therefor, each control comprising a depressible piston valve, means operated by the depression of said piston valve to a predetermined point for admitting fluid under pressure to the corresponding welding unit, a circuit closer operated by a further depression of said piston valve, means for supplying welding current to the welding units operated by said circuit closer, a traveler movable parallel to said series of controls and a cam carried by said traveler for successively depressing said piston valves, said cam having spaced steps for depressing said piston valve to the point for hydraulically operating the welding unit without closing the electric circuit, and an intermediate step for closing the electric circuit while maintaining hydraulic pressure on the welding unit.

8. In a welding machine, the combination with a plurality of individual welding units each having hydraulically operated pressure means, of a plurality of means for supplying welding current at different voltages to which said units are alternatively connected, a series of controls for the respective units each including hydraulic pressure supplying means and an electric circuit closer, alternative electrical connections between the circuit closers of said controls and the respective welding current supplying means and means for operating said controls in sequence.

9. In a welding machine, the combination with a series of individually operable welding units, of a series of controls for the respective units, a traveler for operating said controls in sequence and means for varying the welding action of said welding units when operated by their respective controls.

10. In a welding machine, the combination with a series of individually operable welding units, of a series of controls for the respective units, a traveler for operating said controls in sequence, and means for varying the length of time of operation of said welding units when actuated by said controls.

11. In a welding machine, the combination with a series of individually operable welding units, of a series of controls for the respective units, a traveler for operating said controls in sequence, means positionable in predetermined relation to a selected welding unit control to be operable simultaneously therewith by said traveler to alter the welding action of the corresponding welding unit.

12. In a welding machine, the combination with a plurality of individual welding units, of means for supplying welding current at different voltages, a series of controls for the respective units adapted to alternatively connect the high or low voltage current thereto, and means for operating said controls in sequence.

HANS G. WARNKE.